L. W. WITRY.
STEERING GEAR FOR TRACTORS.
APPLICATION FILED JULY 23, 1917.

1,381,384.

Patented June 14, 1921.

Witnesses:

Inventor,
L. W. Witry, by
G. C. Kennedy,
Attorney.

UNITED STATES PATENT OFFICE.

LOUIS W. WITRY, OF WATERLOO, IOWA, ASSIGNOR TO WATERLOO GASOLINE ENGINE COMPANY, OF WATERLOO, IOWA.

STEERING-GEAR FOR TRACTORS.

1,381,384.

Specification of Letters Patent.   Patented June 14, 1921.

Application filed July 23, 1917.   Serial No. 182,294.

*To all whom it may concern:*

Be it known that I, LOUIS W. WITRY, a citizen of the United States of America, and a resident of Waterloo, Blackhawk county, Iowa, have invented certain new and useful Improvements in Steering-Gears for Tractors, of which the following is a specification.

My invention relates to improvements in steering-gear for vehicles, and the object of my improvement is to furnish as a part of such gear, a drum formed in the shape of a worm, whose thread is modified in such a way that it will keep the steering chains or cables taut while being wound or unwound thereon in the action of steering the vehicle.

This object I have accomplished by the means which are hereinafter described and claimed, and which are illustrated in the accompanying drawings, in which—

Similar numerals of reference denote corresponding parts throughout the several views.

Figure 1:
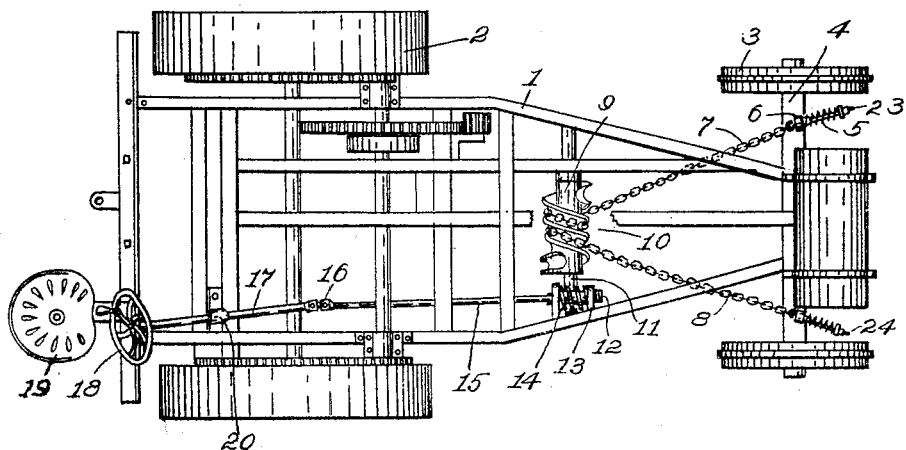
Figure 1 is a plan view of the chassis and running-gear of a tractor with my improved steering gear mounted thereon, and showing other parts removed.

Referring first to Fig. 1, the numeral 1 denotes the chassis of a tractor mounted on traction wheels 2 and steering wheels 3, the latter connected by means of a medially pivoted axle 4. A transverse rotary shaft 11 is mounted in said chassis and upon said shaft is secured medially a winding drum 9 having thereon the channel thread 21. A double hook 10 is fixed on the middle of said drum and adjacent ends of the steering chains 7 and 8 are secured to their respective hooks so that the chains may be carried in the channel of said thread reversely to have their forward ends carried to the front divergingly and secured to bolts 23 and 24 respectively passed through orificed lugs 6 on opposite ends of said axle 4, springs 5 being seated between adjusted nuts on said bolts and said lugs thus affording a resilient connection between each chain and said axle.

A worm wheel 12 is mounted upon the shaft 11, and is in mesh with a worm 14 on a worm-shaft section 15, the latter rotatably mounted in bracketed bearings 13 on the chassis. The end of the worm-shaft section 15 is connected by means of a universal joint 16 with a shaft section 17, the latter adapted to work in a bearing 20 supported on said chassis, and having a hand wheel 18 on its rear end near the seat 19 of the tractor.

Figure 2:
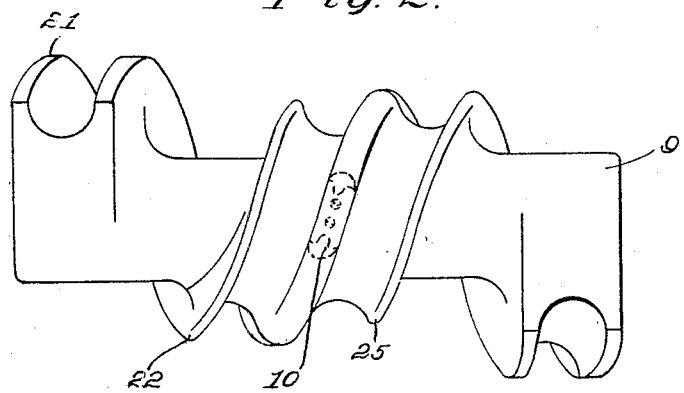
Fig. 2 is an enlarged detail plan view of the winding drum of said steering-gear.

Referring now to Fig. 2, it will be seen that the worm thread 21 is of less diameter and pitch at its central portion 22 and 25 than in its opposite outer parts. The object of this is to cause the drum 9, when winding up either of the chains 7 or 8, to keep the chain which is being wound up taut, and this action is due to the increase of the diameter and the widening of the pitch of the outer parts of the worm thread.

Having described my invention, what I claim as new, and desire to secure by Letters Patent, is:

1. The combination with the pivoted steering axle of a vehicle, of a winding-drum having a channeled worm-thread thereon, securing means on the middle part of said drum, said thread gradually widening in pitch from its middle toward its ends, also increasing in diameter from its middle toward its ends, and steering chains or cables connected between opposite ends of said axle and said securing means so as to wind oppositely on said drum in the channel of said thread.

2. The combination with the pivoted steering axle of a vehicle, of a winding-drum having a single channeled worm-thread thereon, said thread gradually widening in pitch from its middle toward its ends, also increasing in diameter from its middle toward its ends, and flexible connecting bodies connected between opposite ends of said axle and the middle of the drum so as to wind oppositely on said drum in the channel of said thread.

Signed at Waterloo, Iowa, this 5th day of Aug. 1916.

LOUIS W. WITRY.

Witnesses:
 PEARL M. STANTON,
 G. C. KENNEDY.